Aug. 10, 1937.  F. L. LINDSTROM ET AL  2,089,276
FRAMING ADJUSTMENT FOR FILM GUIDES
Filed July 13, 1935
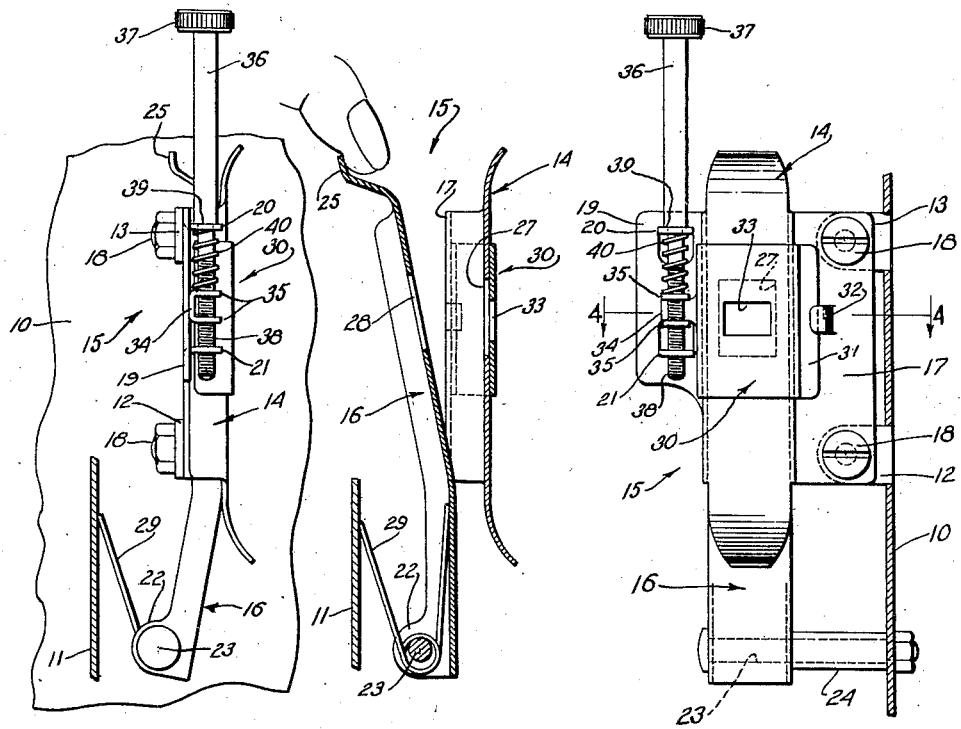
Fig. 1   Fig. 3   Fig. 2
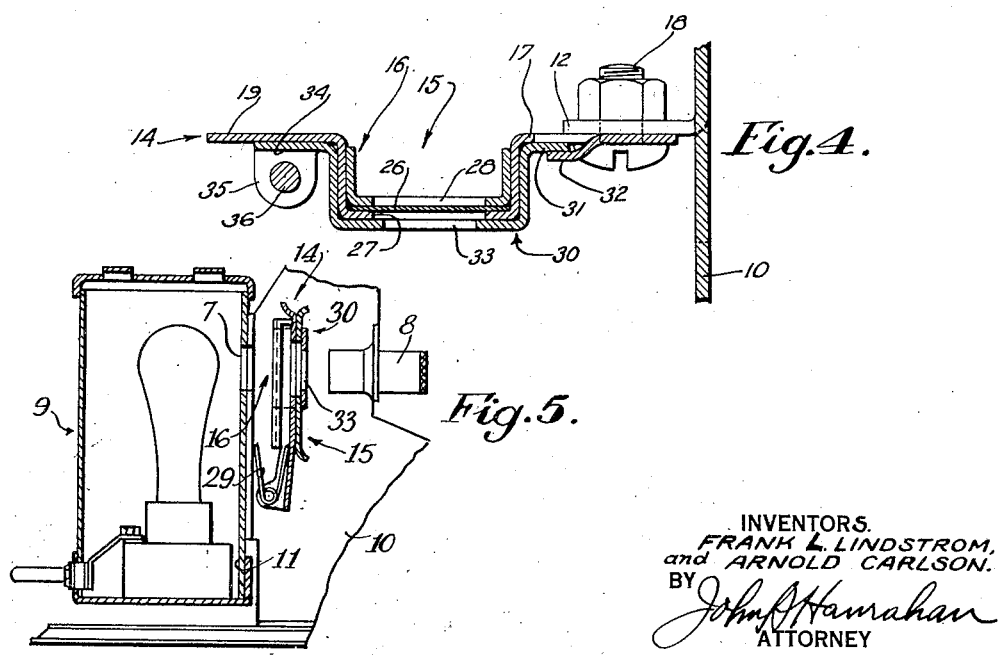
INVENTORS.
FRANK L. LINDSTROM,
and ARNOLD CARLSON.
BY John J Hanrahan
ATTORNEY Patented Aug. 10, 1937

2,089,276

UNITED STATES PATENT OFFICE 2,089,276

FRAMING ADJUSTMENT FOR FILM GUIDES

Frank L. Lindstrom and Arnold Carlson, Bridgeport, Conn.; said Carlson assignor to said Lindstrom Application July 13, 1935, Serial No. 31,203

3 Claims. (Cl. 88—17)

This invention relates to new and useful improvements in motion picture apparatus and has particular reference to a framing adjustment for the film guide of a motion picture machine.

An object of the invention is to provide a means easily adjustable for correcting the framing of a film after the latter is in the film guide or gate of the machine.

Another object is to provide a simple and inexpensive gate construction and also to provide a means for correcting framing the picture and which means is of simple and inexpensive construction.

Other objects and advantages will become apparent from a consideration of the following detailed description taken in connection with the accompanying drawing wherein a satisfactory embodiment of the invention is shown. However, it will be understood that the invention is not limited to the details disclosed but includes all such variations and modifications as fall within the spirit of the invention and the scope of the appended claims.

In the drawing:

Fig. 1 is an edge view showing a film gate constructed according to the present invention and having mounted thereon the present framing adjustment;

Fig. 2 is a front elevational view taken looking from the right in Fig. 1;

Fig. 3 is a vertical central sectional view showing the film gate open;

Fig. 4 is a horizontal sectional view taken substantially along the line 4—4 of Fig. 2; and Fig. 5 is a sectional view on a smaller scale showing the relation between the lamp box, film gate and lens system.

The invention as herein disposed is applied to a motion picture projector machine and particularly to an inexpensive or toy projector such as is generally provided for home use although it is to be understood that the invention is not limited to use in the connection indicated. In the drawing 10 is a portion of a frame plate of a machine and 11 is a portion of the front wall of the lamp box 9 of the machine.

Frame portion 10 has a pair of vertically spaced ears 12 and 13 lanced and pressed therefrom to project laterally thereof and on such ears there is mounted the front section 14 of a gate generally designated 15 and also including a pivotally mounted rear section 16. A tubular lens carrying member 8 is mounted on frame portion 10 at the forward side of gate 15. Section 14 is transversely U-shaped and from one of its longitudinal edges there extends a flange-like part 17 secured to the lugs 12 and 13 by the bolts 18 although it will be appreciated that the parts may be secured together by other means, if desired, it being only necessary that the front gate section be securely mounted in a fixed position. From the other longitudinal edge of the front gate section 14 there projects an extension 19 arranged substantially parallel with the extension 17 and having upper and lower lugs 20 and 21 lanced and pressed therefrom to extend forwardly thereof in substantially parallel relation.

Gate section 16 is also an elongated transversely U-shaped member and extends below the gate section 14 and adjacent its lower end is provided with enlargements or ears 22 through which pass a bolt or stud 23 whereby the section is pivotally mounted. The bolt 23 is passed through the frame plate 10 and about the bolt between the plate and the gate section 16 there is arranged a sleeve-like spacing member 24.

Thus, section 16 is pivotally mounted for swinging movement relative to the section 14 and the dimensions and relationship of the parts is such that the section 15 may enter the section 14 as shown in Figs. 1 and 4 but may be swung rearwardly with respect thereto as shown in Fig. 3. In this last figure a thumb piece 25 at the upper end of the rear gate section has been engaged and the gate section swung outwardly from normal position.

The film being exposed is fed in any desired manner and passes between the front and rear gate sections 14 and 16 and a piece of film 26 is shown in place in Fig. 4. For the exposure of the film the front gate section is provided with a relatively large opening 27 while the rear gate section is provided with an opening 28 of the size of the opening 27. These openings register and are of greater area than the size of the parts of a film to be exposed and the framing of the film is accomplished by a means to be described.

A spring 29 has an intermediate portion disposed about the pivot bolt 23 and has its arms bearing against the gate section 16 and the wall 11 of the lamp box respectively and the arms of such spring tending to move away from one another the gate section 16 is normally held pressed into the rear open side of the gate section 14. By pulling the rear gate section outwardly to the position of Fig. 3 it will be apparent that a film may readily be inserted into the gate.

Slidable vertically on the outer face of the front gate section 14 is a framing plate 30 also substantially U-shaped in transverse section and fitting against the outer surface of the gate section 14. This framing plate includes a laterally extending flange 31 extending under a guide lug 32 lanced and pressed from the mounting flange 17 of the front gate section.

In its intermediate portion the plate has an aperture 33 of the size of the parts of a film to be exposed. Also the plate includes a relatively small lateral extension 34 arranged parallel with and at the front side of extension 19 between the lugs 20 and 21 thereof. Extension 34 at its upper and lower edges is provided with forwardly extending lugs 35 arranged between and parallel with the lugs 20 and 21 previously referred to.

By sliding the plate 30 vertically on the front gate section the aperture 30 of the plate may be adjusted relative to the registering apertures 27 and 28 of the respective gate sections and thereby properly frame a film being exposed. For moving the plate a member 36 is provided and at its upper end may include a knurled head 37 to be gripped for turning the member and its lower portion is reduced to provide a shoulder 39 and screw threaded as at 38. The reduced portion of the member 36 passes freely through openings in the lugs 20 and 21 but is threaded through the lugs 35 and the shoulder 39 bears against the upper surface of the lug 20.

About the reduced portion of the member between the upper lug 35 and the lug 20 and at its respective ends bearing against such lugs is a coil spring 40. Since the member 36 is threaded through the lugs 35 and since the lug 20 is carried by a stationary or fixed member it will be apparent that the spring 40 is constantly tending to force the lugs 35 and the plate 30 carrying such lugs, downwardly and that downward movement of these parts under the influence of the spring is prevented by engagement of the shoulder 39 of the operating member with the upper suface of the lug 20.

In addition to assisting in the guiding of vertical movements of the framing plate the lug 32 prevents movement of said plate outwardly with respect to the gate 15. Since the member 36 has screw threaded engagement with the lugs 35 it will be apparent that on turning of said member in one direction or the other the plate will be moved vertically up or down, depending on the direction in which the member 36 is turned. In this way the position of the aperture 33 is adjusted relative to the registering apertures 27 and 28 of the gate sections so as to properly frame the film being exposed. The spring 40 prevents free or loose movements of the parts and also maintains the shoulder 39 of the member 36 against the lug 20 so that such member has no free longitudinal movement and therefore any turning of such member must result in the plate 30 being moved longitudinally on the gate 15.

Attention is directed to the fact that all of the parts are of sheet metal so constructed that they may be readily formed on presses and thus inexpensively manufactured. It is also noted that the entire construction readily lends itself to manufacture from sheet metal parts so that the apparatus may be manufactured at low cost without expensive machining operations. With the construction disclosed it will be apparent that very close fitting of the parts is not required and that relatively great tolerances may be allowed without rendering the apparatus inoperative. Therefore, the construction disclosed particularly lends itself to quantity production at low cost and is particularly adapted for apparatus designed for home use.

Having thus set forth the nature of our invention, what we claim is:

1. In combination, a motion picture machine comprising a lamp box including a front wall and a frame plate at right angles to and projecting forwardly of said front wall, a pair of lugs extending laterally from said frame plate and arranged forwardly of the front wall of the lamp box, front and rear film gate sections, said front film gate section comprising a vertically disposed elongated transversely U-shaped member having a laterally extending wing-like portion at one edge and having its side arms extending toward the lamp box, means rigidly securing said wing-like portion to said lugs, said rear film gate section disposed between the front gate section and the front wall of the lamp box and comprising a vertically disposed elongated transversely U-shaped member extending below the front section, a stud extending laterally from the frame plate at a point downwardly with respect to the lower end of the front gate section, and said rear gate section pivotally mounted on said stud with its connecting portion toward the front gate section for swinging movement into and out of the front gate section.

2. In combination, a motion picture machine comprising a lamp box including a front wall and a frame plate at right angles to and projecting forwardly of said front wall, a pair of lugs extending laterally from said frame plate and arranged forwardly of the front wall of the lamp box, front and rear film gate sections, said front film gate section comprising a vertically disposed elongated transversely U-shaped member having a laterally extending wing-like portion at each vertical edge and having its side arms extending towards the lamp box, means rigidly securing one of said wing-like portions to said lugs, a pair of vertically spaced forwardly projecting lugs on the other of said wing-like portions, said rear film gate section disposed between the front gate section and the front wall of the lamp box and comprising a vertically disposed elongated transversely U-shaped member extending below the front gate section, a stud extending laterally from the frame plate at a point downwardly with respect to the lower end of the front gate section, said rear gate section pivotally mounted on said stud with its connecting portion toward the front gate section for swinging movement into and out of the front gate section, a framing device comprising a transversely U-shaped member straddling and guided by and vertically adjustable along the stationary film gate section, laterally extending ears on said member and extending between said forwardly projecting lugs, and a screw passing through and turnable in said lugs but threaded to said ears for vertical adjustment of the member along the gate section on turning of the screw.

3. A unit comprising a pair of film gate sections and a film framing device, said film gate sections comprising a stationary section and a section movable into and out of the stationary section, each of said sections comprising an elongated vertically disposed transversely U-shaped piece, laterally extending wing-like portions at the vertical edges of the stationary gate section, a guide lug on one of said portions and substantially parallel thereto, a perforated lug on the other of said portions and substantially at right angles thereto, said framing device comprising a transversely U-shaped member straddling and guided by and vertically adjustable along the stationary gate section, a laterally extending wing-like portion on one edge of said member and disposed under said guide lug, a lateral ear at the other edge of said member, and a screw passing through and turnable in the perforated lug but threaded to said ear for vertical adjustment of the member along the stationary gate section on turning of the screw.

FRANK L. LINDSTROM.
ARNOLD CARLSON.